United States Patent Office 3,063,748
Patented Nov. 13, 1962

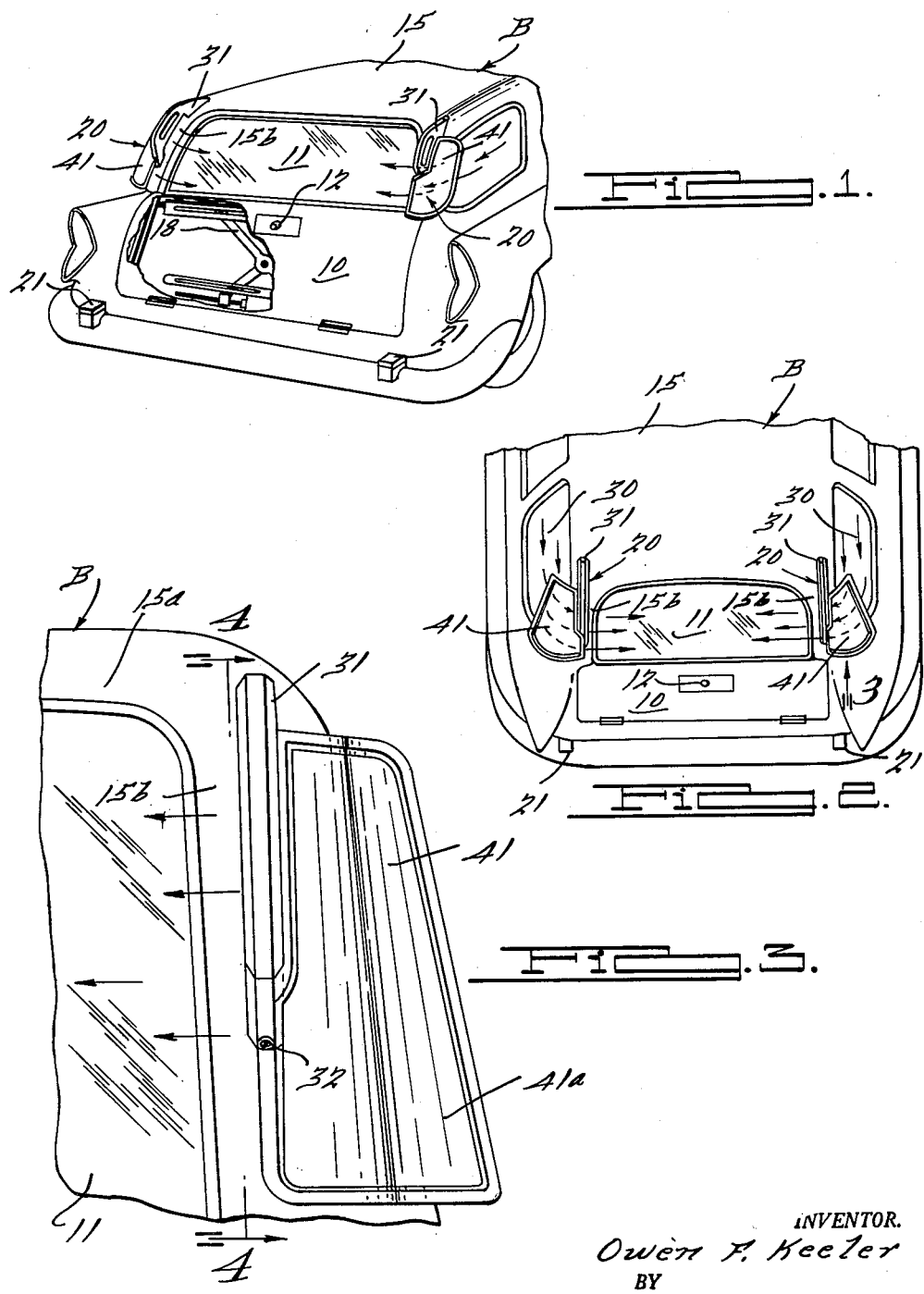

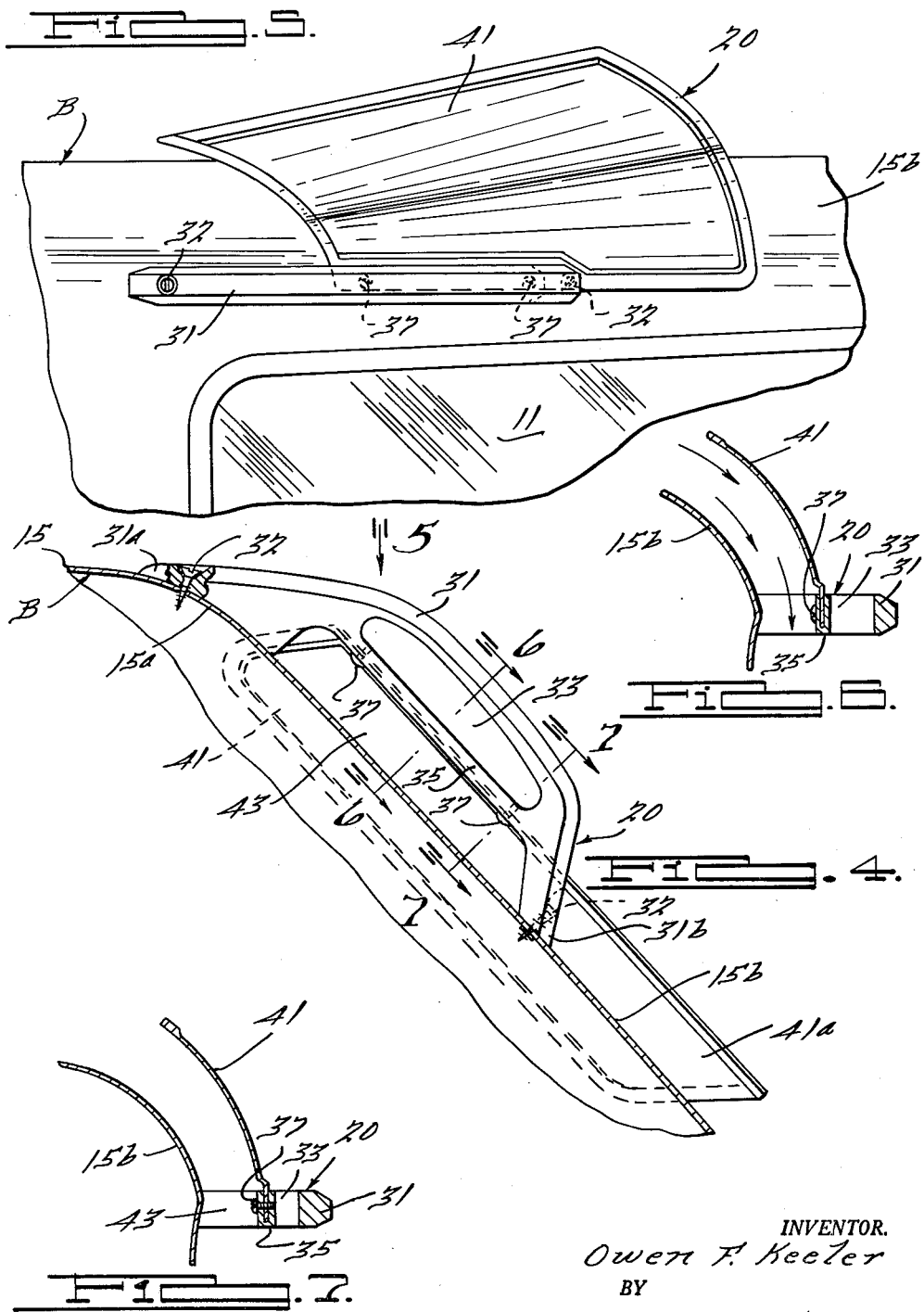

3,063,748
COMBINATION HANDLE AND AIR DEFLECTOR
Owen F. Keeler, Grosse Pointe Farms, Mich., assignor to Chrysler Corporation, Highland Park, Mich., a corporation of Delaware
Filed May 3, 1961, Ser. No. 107,458
5 Claims. (Cl. 296—91)

This invention relates to a combination body handle and air flow deflector adapted to be permanently or detachably applied to the vehicle body adjacent a rear window opening thereof, whereby air flow along the body will be deflected across the vehicle window located at the rear of the vehicle in order to prevent the accumulation of dust, dirt, snow, or the like, on the rear window surface.

It is know that a partial vacuum forms in the area at the rear of a vehicle when it is traveling forwardly such that dirt, dust, snow or the like tend to accumulate on the body and window surfaces extending across the rear portion of the vehicle.

It is a prime object of this invention to provide a combination handle and air flow deflector at the rear portion of the vehicle such that air flow along the vehicle body will be directed or deflected across the body rear end surface in such a manner that it will prevent the deposition of dirt, dust, snow, or the like, on the rear window surface.

It is another object of this invention to provide an air flow deflector for the window opening of a suburban type vehicle tailgate that is compatible with the vehicle body styling and does not interfere in any way with operation of the tailgate window and/or the associated tailgate that extends across the rear portion of the vehicle body.

It is still another object of this invention to provide an air flow deflector for the rear window of a motor vehicle which deflector may be constructed so it can be readily added as a permanently installed or detachable accessory for the vehicle by a relatively simple installation procedure.

It is still another object of this invention to provide an air flow deflector for the tailgate window of a suburban-type vehicle that is an integral part of a handle assembly applied to the rear end of the vehicle body to assist persons in entering and leaving the body interior through the tailgate opening.

It is still another object of this invention to provide a combination handle and air flow deflector for the tailgate window of a suburban type motor vehicle that includes deflector supporting means formed as an integral part of the handle mounting means.

It is still another object of this invention to provide an air flow deflector for a tailgate window of a suburban-type motor vehicle that serves a dual function namely, to provide an air wash across the associated window panel to prevent the accumulation of dust, dirt, snow, or the like, on the outer surface of the window panel and to also include as a part of the deflector mounting means a handle to assist persons to enter or leave the vehicle body through the rear end tailgate opening.

It is still another object of this invention to provide a combination mounting assist handle and air flow deflector for a window opening of a motor vehicle body passenger entrance wherein the handle unit is apertured to receive a deflector vane and to also provide air ports through which air currents may be passed to provide an air wash for the adjacent window panel.

Other objects and advantages of this invention will become readily apparent from a reading of the following description and a consideration of the related drawings wherein:

FIG. 1 is a perspective view looking at the rear end of a motor vehicle of the suburban type to which an embodiment of this invention has been applied;

FIG. 2 is a top plan view of the portion of the vehicle shown in FIG. 1;

FIG. 3 is an enlarged fragmentary elevational view of the combination handle and air flow deflector, the view being taken looking in the direction of the arrow 3 of FIG. 2;

FIG. 4 is a sectional elevational view of the combination handle and air deflector, the view being taken along the line of and in the direction of the arrows 4—4 of FIG. 3;

FIG. 5 is a fragmentary top plan of this invention, the view being taken looking in the direction of the arrow 5 of FIG. 4;

FIG. 6 is a sectional elevational view taken along the line and in the direction of the arrows 6—6 of FIG. 4; and FIG. 7 is a sectional elevational view taken along the line and in the direction of the arrows 7-7 of FIG. 4.

FIG. 1 of the drawings shows the rear end portion of a current type of suburban or station wagon motor vehicle. This vehicle body B has a hingedly mounted tailgate 10 extending across the lower portion of the body rear end and the tailgate 10 mounts an adjustable rear window unit 11 that extends across the upper portion of tailgate 10. Window 11 is adapted to be telescopically moved into and extended from the tailgate 10 by mechanism 18 actuated through the control 12 on the tailgate 10. Control 12 may be a manually operable crank or a key operated switch that will energize an electrically operated window adjusting mechanism 18 located within the tailgate 10.

The vehicle body B has a roof 15 that curves downwardly at its read end portion 15a so that the roof portion 15a blends into the downwardly and rearwardly sloping plane of the tailgate window element 11 (see FIG. 4). The sides of the window 11 are supported in the body rear end D posts 15b. Mounted on each of the vehicle body rear end D posts 15b is an air flow deflector device 20.

The air flow deflector device 20, that embodies this invention, is a combination handle and air flow deflector that serves a dual function. It is well-known that the entry or exit of persons to or from the interior of a suburban-type vehicle body B, through the tailgate opening at the rear end of the suburban type vehicle, can be materially aided by the provision of an assist handle or a hand hold on the body D posts 15b at the rear end of the body. It is conventional for persons entering or exiting through the tailgate opening at the rear end of a suburban-type vehicle body to place one foot on the mounting step 21 at the mounting side of the body B and at the same time to grasp the adjacent D post to steady themselves while they pass into or out of the tailgate opening. Recently body hardware handles of various sorts have appeared on the market for application to the D post area of the suburban-type vehicle. Along with the increase in popularity of the suburban type vehicle has come a desire to provide in this type vehicle all of the attributes of a passenger vehicle while also retaining the cargo carrying features of this type of vehicle. Because of the large window area of the tailgate, the problem of dirt and snow accumulation on the tailgate window 11 has been a matter of major concern to manufacturers of vehicle bodies. A very efficient way of keeping the tailgate window area clear of all foreign matter is to apply an air deflector to the rear end portion of the vehicle. The air deflector is arranged to deflect air currents passing along the sides and/or top of the car body across the tailgate window area so as to wash this area clean of any foreign matter. The deflected air also provides a positive pressure area at the rear of the vehicle to counteract the low pressure area usually existing at the rear end of a moving vehicle and thus there is little tendency for dust, dirt, snow and the like to deposit on the tailgate window surface.

As both a body rear end handle and a rear window air deflector are desirable on a suburban-type vehicle and as both of these accessories can be mounted in approximately the same location along the D post of the suburban vehicle body, this invention concerns a dual purpose combination handle and air deflector unit 20 adapted for mounting on the body D post or on the adjacent body area.

The combination handle and air deflector unit 20 comprises a handle element 31 that is of substantially R-shaped (see FIG. 4) in side elevation. This handle element 31 is a rigid structural piece that is preferably a casting. The handle element 31 has two leg portions 31a and 31b that are seated on the body D post portion 15b and fixedly connected thereto by screws 32 or by any other type of equivalent body fastening means such as rivets, bolts, cleats, welding, bonding, or the like. The upper portion of the handle element 31 has an elongated opening 33 adapted to receive a portion of the hand of the person grasping the handle element 31. The cross bar portion 35 of the handle unit 31 provides a mounting bar for the sheet-like air deflector blade or vane 41. From FIGS. 6 and 7 it will be noted that the handle cross bar 35 is slotted to receive an edge of the deflector blade 41. Screws, rivets or the like 37 can be used to anchor the edge of the deflector blade or vane 41 in the handle cross bar portion 35.

It will be noted that there is another opening 43 in handle 31 beneath the cross bar portion 35. This opening 43 is to permit a portion of the air deflected by the deflector blade 41 to pass through the handle element 31 and flow transversely across the adjacent tailgate window panel 11. It will also be noted (see FIG. 4) that the deflector blade 41 is considerably longer than the handle 31 so that the lower end portion 41a of the blade 41 projects as an overhanging panel without direct support beneath it. Obviously any air deflected by the blade portion 41a can be readily passed transversely across the tailgate window 11 because there is no portion of the handle 31 arranged to interfere with the air deflected by the overhanging lower portion 41a of the blade or vane 41. Because of the curved shape of the blade or vane 41 it acts as a scoop to gather in and redistribute the air passing rearwardly along the sides of the vehicle body as the vehicle is in forward flight.

In the installation of the combination handle and air deflector 20 it is preferable to use some type of self-sealing screws 32 to anchor the accessory unit 20 to the vehicle body B by a watertight connection. An advantage of this accessory unit is that it can be applied either as original equipment by the vehicle manufacturer or purchased as an accessory and readily installed by the vehicle owner or by a service garage attendant.

Now considering FIG. 2 in particular, it will be noted that as the vehicle body B is moved forwardly there is an air flow rearwardly along the sides of the vehicle as indicated by the several arrows 30. Because of the mounting of the air flow deflector 20 along the rearwardly located vehicle body D post 15b, the air flow currents 30 are redirected or deflected transversely across the vehicle body rear window 11 and tailgate 10 so as to provide a fast moving air spray or air sheet that sweeps across the window 11 and keeps it free from any accumulation of dirt, dust or snow, or any other foreign matter that might tend to lodge upon the sloping window 11 and tailgate 10 of vehicle body B.

It is a known fact that there is a partial vacuum formed across the rear end of a vehicle as the vehicle body moves forwardly and because of this partial vacuum there is normally a tendency for dirt, dust, snow, and the like, to be sucked up from the roadway and from the area adjacent the rear end of the vehicle and deposited upon the outer surfaces of the rear window 11 and the tailgate 10. By the simple expedient of mounting an air flow deflector 20 along the vehicle body rear end posts 15b, a fast moving air current is directed across the rear window 11 and a portion of the tailgate 10 so as to counteract the vacuum effect that would otherwise be present at the rear end of the vehicle. The air current provided by the air deflectors 20 is most efficient in sweeping the rear window 11 clean of any foreign matter so that the rear end of the vehicle body, particularly the window 11, will be clear of any deposition of dust, dirt, snow, or the like, thereby giving the vehicle operator and the vehicle passengers maximum visibility at all times through the rear window 11.

The combination handle and air flow deflector 20 is shaped to conform to the general styling of the vehicle body and its associated hardware and presents a pleasing appearance in addition to being aerodynamically designed so that it will not create noise or power loss problems as the vehicle is moved forwardly at normal vehicle speeds.

I claim:

1. A combination air deflector and mounting handle adapted to be mounted on the exterior surface of a vehicle adjacent a windowed passenger entrance closure member comprising a handle element supporting an air deflector blade of the scoop-type arranged to deflect air currents across the closure member window, said handle having an apertured hand grasp portion and a deflector blade supporting portion with the blade supporting portion comprising a slotted bar portion that receives an edge portion of the air deflector blade.

2. A combination air deflector vane and passenger mounting assist handle adapted to be mounted on the exterior surface of a vehicle adjacent a windowed passenger entrance closure member comprising a handle element of substantially R-shaped side elevational configuration wherein the loop portion of said R-shaped handle provides the assist handle and the leg portions of said handle provide the mounting supports for attachment to the associated vehicle body exterior surface, the interiorly arranged cross bar of the loop portions providing a support for a scoop-type air deflector vane.

3. A combination air deflector vane and passenger mounting assist handle adapted to be mounted on the exterior surface of a vehicle adjacent a windowed passenger entrance closure member comprising a handle element of substantially R-shaped side elevational configuration wherein the loop portion of said R-shaped handle provides the assist handle and the leg portions of said handle provide the mounting supports for attachment to the associated vehicle body exterior surface, the interiorly arranged cross bar of the loop portions providing a support for a scoop-type air deflector vane that has edge portions thereof seated in a slot in said cross bar of the loop portion.

4. In combination with a vehicle body having a windowed closure member for a passenger entrance to the body interior, a combination air flow deflector vane and passenger mounting assist handle adapted to be mounted on the vehicle body adjacent said closure member window comprising a handle portion providing a passenger assist member and also providing a support means for an air deflector vane that is arranged to deflect air currents adjacent the exterior of the vehicle body across the closure member window so as to provide an air wash for said window to prevent the deposition of foreign matter on the window exterior surface, said handle providing an apertured, passenger assist, grasp portion and an adjacent, slotted portion providing a vane supporting means.

5. In combination with a vehicle body having a windowed closure member for a passenger entrance to the body interior, a combination air flow deflector vane and a passenger mounting assist handle adapted to be mounted on the vehicle body adjacent said closure member window comprising a handle portion providing a passenger assist member and also providing a support means for an air deflector vane that is arranged to deflect air currents adjacent the exterior of the vehicle body across the closure member window so as to provide an air wash for said window to prevent the deposition of foreign matter on the window exterior surface, said handle providing an apertured, passenger assist, grasp portion and an adjacent, slotted portion providing a vane supporting means that is spaced from the adjacent body and elevated thereabove by means of handle supporting legs that are fixedly connected to the vehicle body.

References Cited in the file of this patent

UNITED STATES PATENTS

| | | |
|---|---|---|
| 2,888,296 | Huggins | May 26, 1959 |
| 2,919,952 | Riddle et al. | Jan. 5, 1960 |
| 2,933,344 | Shumaker | Apr. 19, 1960 |